(12) United States Patent
Jen et al.

(10) Patent No.: US 6,689,176 B2
(45) Date of Patent: Feb. 10, 2004

(54) METHOD FOR MANUFACTURING A BATTERY

(75) Inventors: Chu Hou Jen, Taipei Hsien (TW); Terng Yu Peng, Taipei (TW); Huang Mu Tsun, Chang Hwa Hsien (TW)

(73) Assignee: Elite Ionergy Co., Ltd. (TW)

( * ) Notice: Subject to any disclaimer, the term of this patent is extended or adjusted under 35 U.S.C. 154(b) by 105 days.

(21) Appl. No.: 09/819,792

(22) Filed: Mar. 29, 2001

(65) Prior Publication Data

US 2001/0036573 A1 Nov. 1, 2001

(30) Foreign Application Priority Data

Mar. 29, 2000 (TW) ........................................ 89105811 A

(51) Int. Cl.[7] ............................................. H01M 10/38
(52) U.S. Cl. ...................................... 29/623.1; 29/623.3
(58) Field of Search ............................. 29/623.3, 623.1

(56) References Cited

U.S. PATENT DOCUMENTS 5,916,515 A * 6/1999 Bryan et al. ............... 29/623.3

6,447,950 B1 * 9/2002 Iijima ......................... 429/209

FOREIGN PATENT DOCUMENTS

| JP | 2000-348695 | * 12/2000 |
| JP | 2001-629414 | * 7/2001 |

* cited by examiner

*Primary Examiner*—John S. Maples
(74) *Attorney, Agent, or Firm*—Burns, Doane, Swecker & Mathis, L.L.P.

(57) ABSTRACT

A method for manufacturing batteries comprises pressing the components of cells with separating plates to form the cells in batteries. Under the conditions of proper pressure, temperature and press time, the present invention provides a method that can rapidly make large-area cells with stable quality. The advantages of the present invention are the mass production of batteries with stable quality and the dramatic increase in the efficiency of production; that is, the present invention reaches both objects of both high yields and low costs in production.

15 Claims, 14 Drawing Sheets

METHOD FOR MANUFACTURING A BATTERY

BACKGROUND OF THE INVENTION

1. Field of the Invention

The present invention relates to a method for manufacturing batteries, and more particularly to a method for the mass production of secondary batteries with a separating plate pressing under stable, highly controlled operating conditions.

2. Description of the Related Art

Because of the high development of consuming electronic products, such as video cameras, products of communication applications and notebook computers, toward the lighter, thinner, smaller, more economic, multifunction and portable requirements, the cost and stability of power source have become the major issues in the development and applications. As considering electrical energy, voltage and environmental protection, traditional batteries (like carbon-zinc, alkaline, mercury, or lithium batteries) are gradually replaced by the secondary batteries capable of running for longer time and charged repeatedly. Moreover, in some fields of application, like battery-powered vehicles, aircraft, microelectronic devices and wireless power supplies, secondary batteries provide broader scope for the development in the future.

Of the secondary batteries (like nickel hydride, NiH, or nickel cadmium, NiCd, batteries), the lithium polymer battery has been a required accessory in the above-mentioned high-class electronic products for its highest energy density and voltage. At present the companies like Ultralife, Valance, Moltec, Sony, Toshiba, Hitachi Maxell etc. are studying the technologies of lithium polymer battery, and most of them are making the products based on the patents of Bellcore.

In a battery, a set of components comprises the following parts: a cathodic current collector web, an anodic current collector web, a separator, a cathode, and an anode. In the manufacturing process, the cathode and anode are first pressed together with the corresponding current collector webs by hot-press rollers 112, and then a separator is added between them and hot-pressed again (or several times) to form the cell configuration. Eventually, a secondary cell is formed by a sequence of adding electrolyte, packing and activating the preformed cell configuration. Although the researches in the technology of lithium secondary battery have been lasting for a period of time, the mass production in his field is still considered not well equipped. The most important reason is that the complicated process of manufacturing and low yield rate lead to a high cost of production.

Pressing process is one of the underlying technologies currently used in making the lithium polymer battery. The object of the process is to hot-press electrodes and a separator together, and to form an anode-separator-cathode sandwich structure. The present pressing method of lithium polymer battery relies on the continuous rollers to put the electrodes and separator together. However, since the hot-pressing rollers are cylindrical in shape, the duration in pressing the electrodes and separator is short and higher pressure is required to obtain the desirable effects. On the other hand, since the substance to be pressed has to be softened enough to have effective compression, the electrodes and separator must be subject to pre-heated and thus the factor of heat conduction must be taken into account. The above two factors become a determining issue if a lithium polymer battery will be able to be pressed effectively. Under higher stress, it is easier to short-circuit the cathode and anode and thus to lose their function of current collecting. Even though short circuit does not occur, it is possible to have stress residue within batteries resulting from high level stress, and the afterward recovery process of the stress relief from the polymer will result in the expansion and then short-circuit. Oppositely, in case of insufficient press or heat energy, it will occurs that the adhesion is imperfect and the resistance of battery is so high as to deteriorate the performance of the battery.

Moreover, pressing for a short period of tine is unfavorable to cohere the interface of electrodes and separator. It is because the occurrence of desirable adhesion must be associated with the diffusion of polymer chains vibration at the interface to the interior of interface to make the chains entangled; however, for the same reason it needs sufficient time to complete the actions of diffusion and vibration, or it needs to raise the temperature of the polymers to adequately supply dynamic energy. Unfortunately, raising temperature not only consumes the power (or wastes money) but also is apt to short-circuit such soft electrode substances between the above-mentioned cathodes and anodes circuit.

In addition, for the sake of increasing the capacity of a battery, it is a must to including more layers of cells in a certain battery combination. In common method of manufacturing the battery, cells with same area are stacked with each other to achieve the above-mentioned object. However, due to the increase in the thickness of stacked components, the roller-pressing method of short time for heat conduction results to undesirable adhesion and battery features for the temperature difference between inner and outer layers of cell components. Moreover, for the purpose of getting higher capacity of battery, it is common to use cell components with a large area or in folded mode; however, the battery shape is thus limited. The current collector webs in folded mode are also easily broken around folded regions. The traditional roller-pressing method is also limited to the gauge between two rollers so as to be unfavorable to the pressing of ticker cells.

To sum up, although the present roller-pressing method posses the advantage in continuous manufacturing, there still exists a number of problems; it is unable to fulfill the requirements in secondary battery of low cost, stable quality, irregular shape and high charging capacity. Therefore, there is an urgent need to find alternatives that can react the tendency of battery industry in high efficiency, high reproducibility, and low cost.

SUMMARY OF THE INVENTION

The present invention discloses a method of producing battery with separating plate to press stacked battery components, especially a method of producing a lithium polymer battery. This method completely takes the advantage of separating plates features in flatness and isolation to overcome the problems of improper adhesion and unable to raise throughput which are met in the traditional pressing method. According to the present invention, pressing can form several layers of cell components in series or in parallel. It dose not need folding and thus avoid the occurrence of breaking. At the same time, since the cells made by the method of present invention can be worked according to a variety of requirements in size to obtain the required capacity and voltage, it keeps the features of workability and the flexibility of shape in making the battery. The manufacturing method of the present invention comprises the following steps: stacking the layers of components making secondary battery to form at least one set of cell components; adding a plurality of auxiliary layers (e.g. as buffer layers, releasing films and separating plates etc.) on each one of the first and second sides of the cell components; setting the at least two heating plates of the hot press on a default temperature; placing at least one set of the cell components and a plurality of auxiliary layers between the at least two heating plates of the hot press; pressing the at least two heating plates with the default temperature to form a cell preform from the stacked at least one set of cell components; eventually activating the cell preform into a cell and then packing cells to a battery.

In comparison with the prior art the present invention includes the following advantages:
1. The longer-duration, lower-stress pressing process is easily controlled to obtain the perfect adhesion between cell components (like anode, separator and cathode) and no short occurs. It dramatically increases the yield rate.
2. Single cell and cells in series and in parallel can be formed by designed combination, and thus dramatically reduce the time required for manufacture and increase the efficiency of production.
3. Pressing method cac press the battery with multi-layer and multi-opening in one time by the multi-opening hot press, which will achieve the object of mass production, extensive increase in the efficiency of production and the reduction of the investment in equipment. (See Table 1).
4. The use of the press with large area can produce a singe large-area cell (in series and/or parallel). The area of cell is arbitrarily determined by the size of press, such as the size of 8"½×11" for electrical mobiles. After pressing, the cells will be able to cut into desirable size to make smaller batteries (suitable for cellular phones or palm-size computer); therefore, the size and shape of the produced battery are extremely flexible.
5. During pressing, the temperature and stress of the pressed materials are constant and stable and extensively improve the stability and yield of the productions, either for the pressing of single cells or the multi-layers/multi-opening mass pressing.

TABLE 1

| Unit | Press Rate $m^2$/min | Production Rate of Cell Preforms cells/day |
| --- | --- | --- |
| Roller Pressing | 0.305 | 21,960 |
| Hot press | 4.74 | 341,280 |

Note:
1. The number of opening of hot press is 10;
2. The number of layers per opening counted is only 14;
3. The widest width of roller pressing currently used is adapted.
4. The size of hot press is 36"×44".

Other features and advantages of the present invention will be apparent from the accompanying drawings and from the detailed description that follows below,

DETAILED DESCRIPTION OF THE PREFERRED EMBODIMENTS

Figure 1:
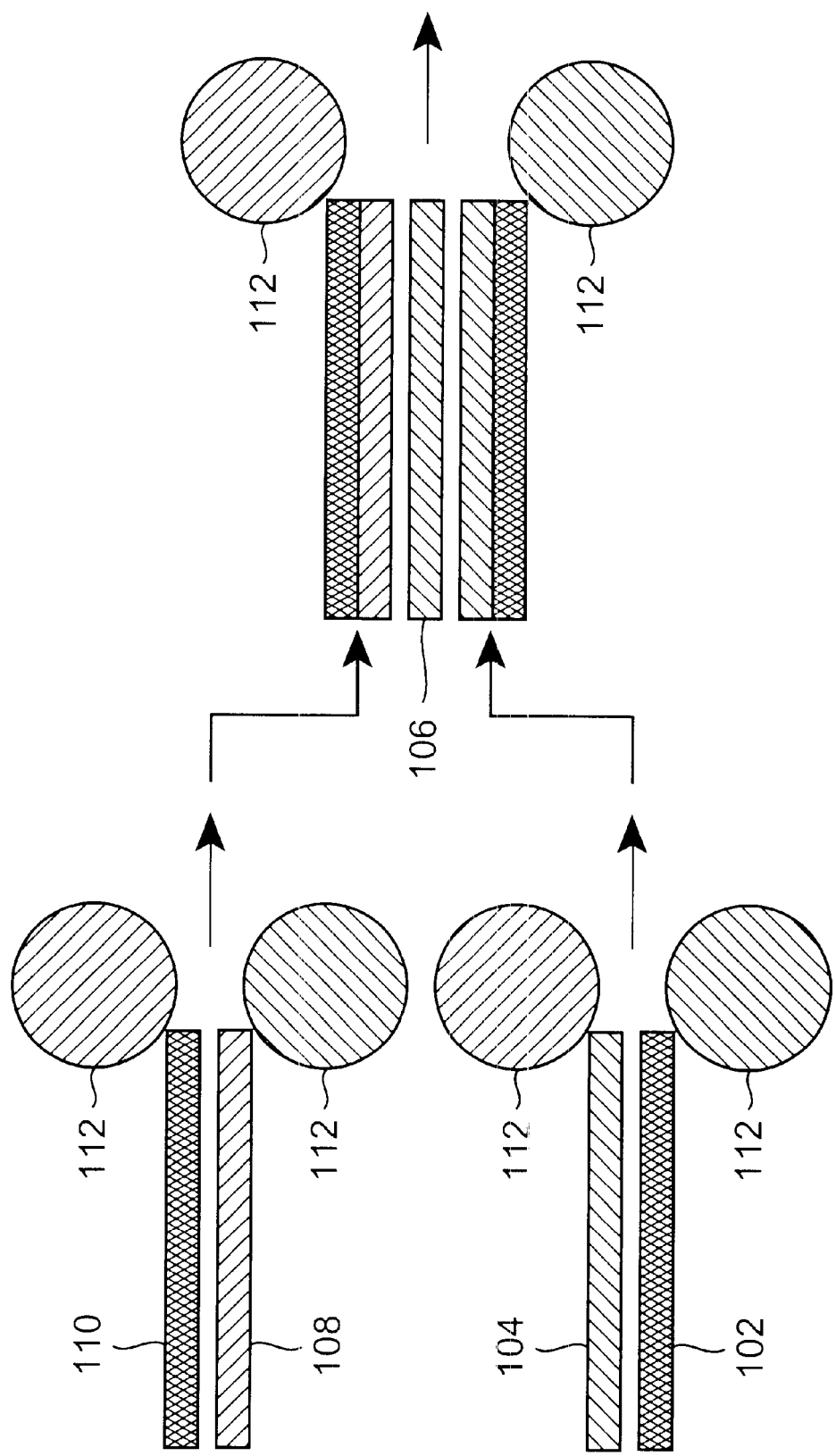
FIG. 1 Hot roller pressing several times.

The present invention discloses a method for manufacturing lithium polymer secondary battery by hot press. It has the features of precise control of temperature. The present invention also uses a separating plate and auxiliary layers like buffers to make the pressing in single action, arid thus reach the object of fast and stable production.

The materials of cells used currently are mainly oxides of $Li_{(1-x)}Mn_2O_4$, $Li_{(1-x)}CoO_2$ and $Li_{(1-x)}NiO_2$ as cathodes. The oxides are dispersed into a solution and binders and plasticizers are added as well. The solution is coated over aluminum Web or carbon fiber non-woven fabric web, and dried into a cathode. The made cathode still needs the treatment of consolidation as so to obtain more uniform thickness. The anode is mainly made of graphite, and can be obtained from dispersing the graphite, binders and plasticizers into a solution and drying the solution. The made anode also requires the treatment of consolidation to get uniform distribution of the coating layer.

The production of a separator is generally prepared from adding 40%–60% plasticizer into electrically conductive polymers and adding about 20% silicate powder in order to increase the mechanical strength of the separator. The separator is used polyethylene terephthalate (PET) as a substrate and the method of dipping-scraping to control the thickness. In order to improve the strength of adhesion between the current collector webs and electrodes, the current collector webs are dipped into 3% polyvinylidene fluoride (PVDF) solution and dried at 310° C. within the furnace for 10~20 seconds prior to the pressing. After the treatment, the binding strength between the current collector web electrode and electrodes are extensively increased. The materials made according to above-mentioned method can be directly applied for the sequential hot pressing process, to massively produce secondary polymer battery of high quality.

As teaching in U.S. Pat. No. 5,296,318 for Gozdz et al. issued on Mar. 22, 1999, the step of preparing the materials made for lithium polymer secondary battery is as follows:

I. The Preparation of Cathodes
1. Solution A was prepared from dissolving 150 g of PVDF (Elf Atochem. 2810) into 1032 g acetone, After the dissolved, 400 g of dibutyl phthalate (DBP) was added into the acetone solution.
2. Solution B was prepared from mixing 900 g of $LiCoO_2$ (FMC Corporation Hectro plus 100) into 1668 g of acetone. Adding (conductive) 300 g of carbon black (MMM super-P 100) into the acetone solution and agitated it with high shear stress.
3. The solution A and B were mixed and agitated with high shear stress.

4. Carbon fabric non-woven webs of 0.178 mm thickness now were dipped into the solution prepared in step 3 to coat the cathode material on the webs. After the dipping, the coated webs were dried at 65° C. for 10 minutes to obtain the cathode with an amount of 560 g/m² adhesives.

II. The Preparation of Anodes

1. Solution C was prepared from dissolving 100 g of PVDF into 913 g of acetone. After dissolved, 300 g of DBP is added into the acetone solution.
2. Solution D was prepared from adding 700 g of graphite (MCMB, Osaka Gas 1028) and 30 g of carbon block into 1012 g of acetone solution and agitated with high shear stress.
3. Solution C and D were mixed and agitated with high shear stress.
4. Carbon fabric non-woven webs (Lydall 6100-020) of 0.74 mm thickness now were dipped into the solution prepared in step 3 to coat the anode material on the webs. After the dipping, the coated webs were dried at 65 C. for 10 minutes to obtain the anode with an amount of 160 g/m² adhesives.

III. The Preparation of Separators

1. Solution E was prepared from dissolving 400 g of PVDF into 1200 g of acetone and then adding 500 g of plasticizer DBP into the solution.
2. Solution F was prepared from dispersing 267 g of silicone particles (SilicA, Cabot cab-0-sil TS 530) in 1950 g of acetone.
3. Solution E and F were mixed and agitated with high shear stress for 1 hour, and then the mixed solution were coated on release films, or on woven glass fabric (glass fabric:1080). After, the coated fabrics were dried in furnace at 65° C. for 5 minutes to obtain the separators with 0.13 mm thickness.

IV. The Treatment of Current Collector Webs

The current collector webs and aluminum webs were dipped in 3% PVDF of acetone solution and dried out at 310° C. for 20 seconds.

EXAMPLE 1

The Press of a Single Cell

Figure 2A:
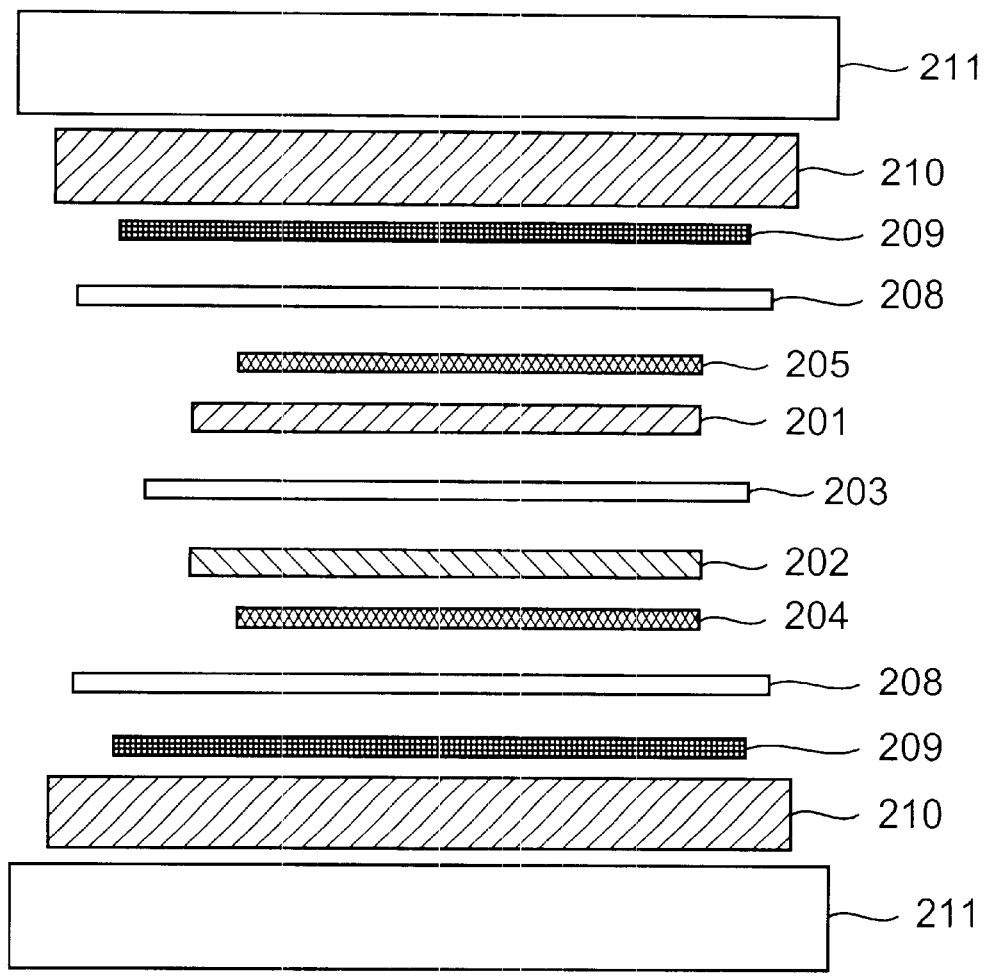
FIG. 2A Pressing of single cell
Figure 3:
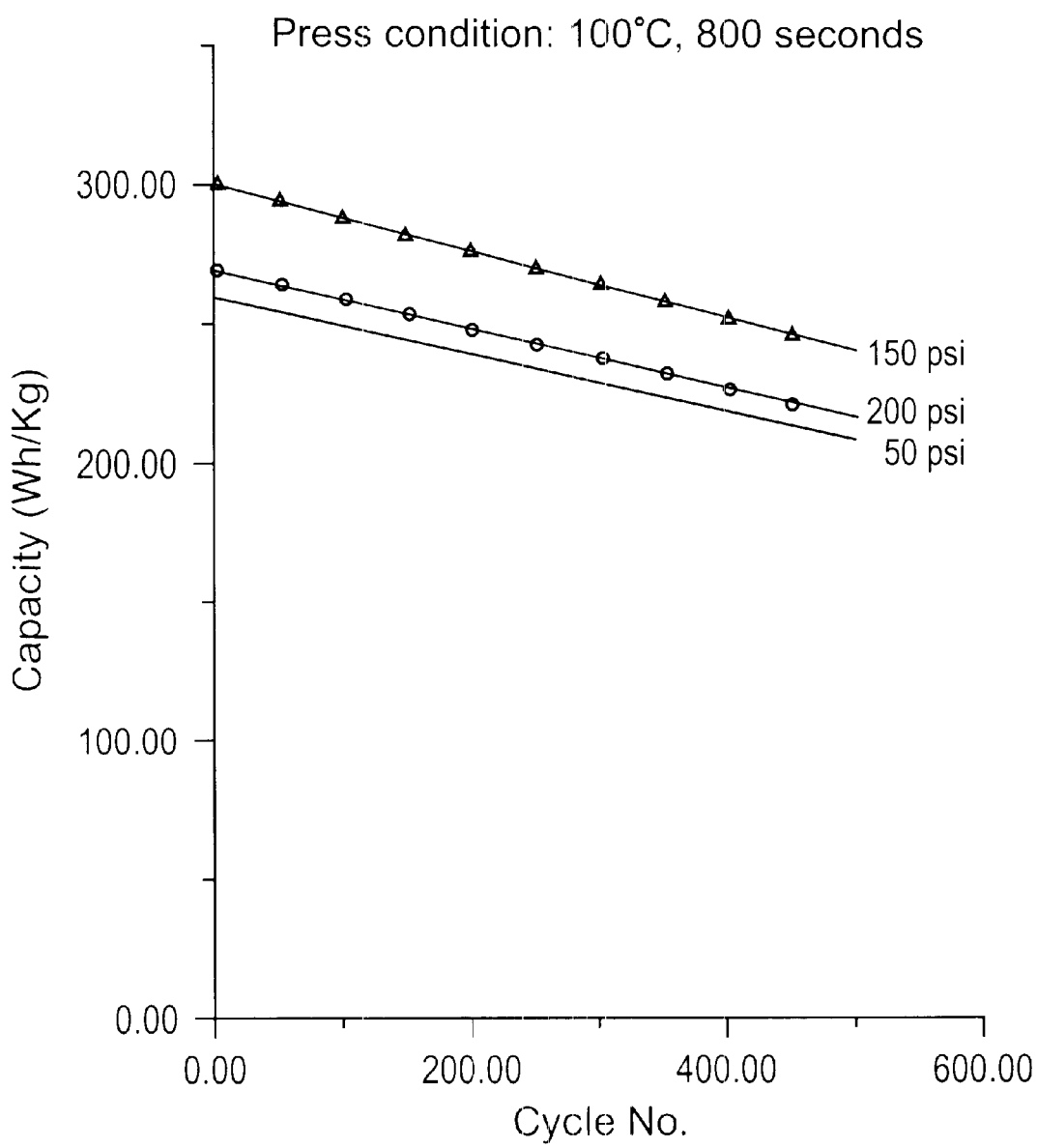
FIG. 3 Pressing of single cell at constant temperatures
Figure 4:
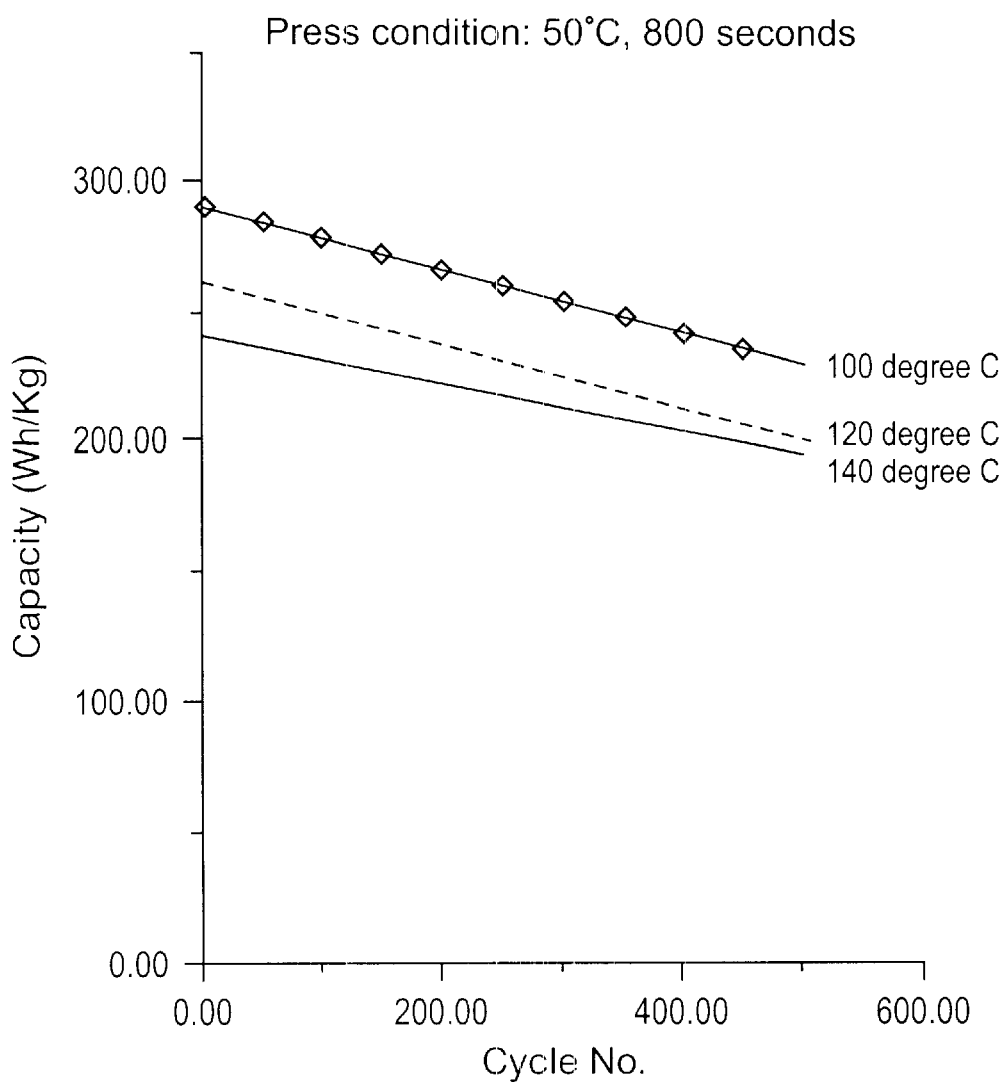
FIG. 4 Temperature vs. Cycle at constant stress for single cell pressing

The cell components made by the above-mentioned methods are cut into 4"×1.5" of cathode 201 and anode 202, one separator 203 of 5"×2", and a copper and an aluminum current collector webs 204 and 205, respectively. According to FIG. 2A, all the components were preliminary stacked into a unit of laminated cell components. Auxiliary layers, like release films 208, separators 209 and buffers, were sequentially added on the first side 206 and second side 207 of each unit, where buffers 209 were Kraft papers for cushioning the inner layers and dispersing the stress, so that the local stress concentration was not produced as pressing due to the uneven surfaces of the electrodes. The size of buffers in this embodiment was 8"×8", The material of release film was PET film, or other plastic films and papers which could be easily removed from the laminated components. The function of release film is to separate the components with the separating plate so that the laminated components will not adhere to the separating plate. The function of the separating plate is to provide the stiffness in pressing and to keep the cell preforms separate with each other so as to sustain the desirable shapes; furthermore, the separating plate has good thermal conductivity to fast transmit energy into the laminated components to be pressed. The separating plate of this embodiment was stainless steel of 1.0 mm thickness and 8"×8" area. The heating plates of the hot press are heated up to 100° C. and fixed, and then the laminated cell components were put into the space between two heating plates. The method of pressing was two-step process: the laminated cell components were first pressed between two heating plates with 20 psi for 120 to 240 seconds, in order to keep the thermal conduction uniform all over the separators and two kinds of electrodes; the stress of second step was applied in the range of 50 to 400 psi as the temperature of the laminated cell components reaches 100° C., and the stress was kept for 120 to 800 seconds (sees). The interfaces of cathode-separator-anode in pressed cell preforms perfectly stick with each other. The electrical resistivity of the pressed cell preforms ranged from 0.1 M to 1 M Ω without the problem of short circuit caused by the contact of cathode and anode. In addition, the stripping strength between copper web and anode was 0.4 kgf/in (Testing method: IPC TM-654 2.4.8); the stripping strength between aluminum and cathode was up to 0.45 kgf/in. Each cell preform was made the extraction in methane for 60 minutes and then dried at 90° C. for 20 minutes; in addition, the preforms were packed into a water- and air-tight bag and electrolytes was filled in at the same time. The composition of the electrolyte is 1 M LiPF$_6$ dissolved in the mixing solution of ethylene carbonate/diethyl carbonate (50/50 in vol %). The activated batteries were under discharge test and the results were shown FIG. 3 and FIG. 4 in accordance with various pressing condition.

In addition, It is noteworthy that the separator of the woven glass fabric has the superior heat-conducting efficacy which is 30% high than that of the conventional PVDF. In addition, the tensile strength of the separator of the woven glass fabric increases dramatically (see table 2).

TABLE 2

| Separator | Sample No. | Force (kgf) |
| --- | --- | --- |
| Separator of the woven glass fabric | 1 | 5.06 |
|  | 2 | 4.35 |
|  | 3 | 4.70 |
|  | 4 | 5.20 |
|  | Average | 4.83 |
| Conventional PVDF separator | 1 | 0.11 |
|  | 2 | 0.09 |
|  | 3 | 0.10 |
|  | 4 | 0.10 |
|  | Average | 0.10 |

EXAMPLE 2

The Press of 10 Bi-Cells

Figure 2B:
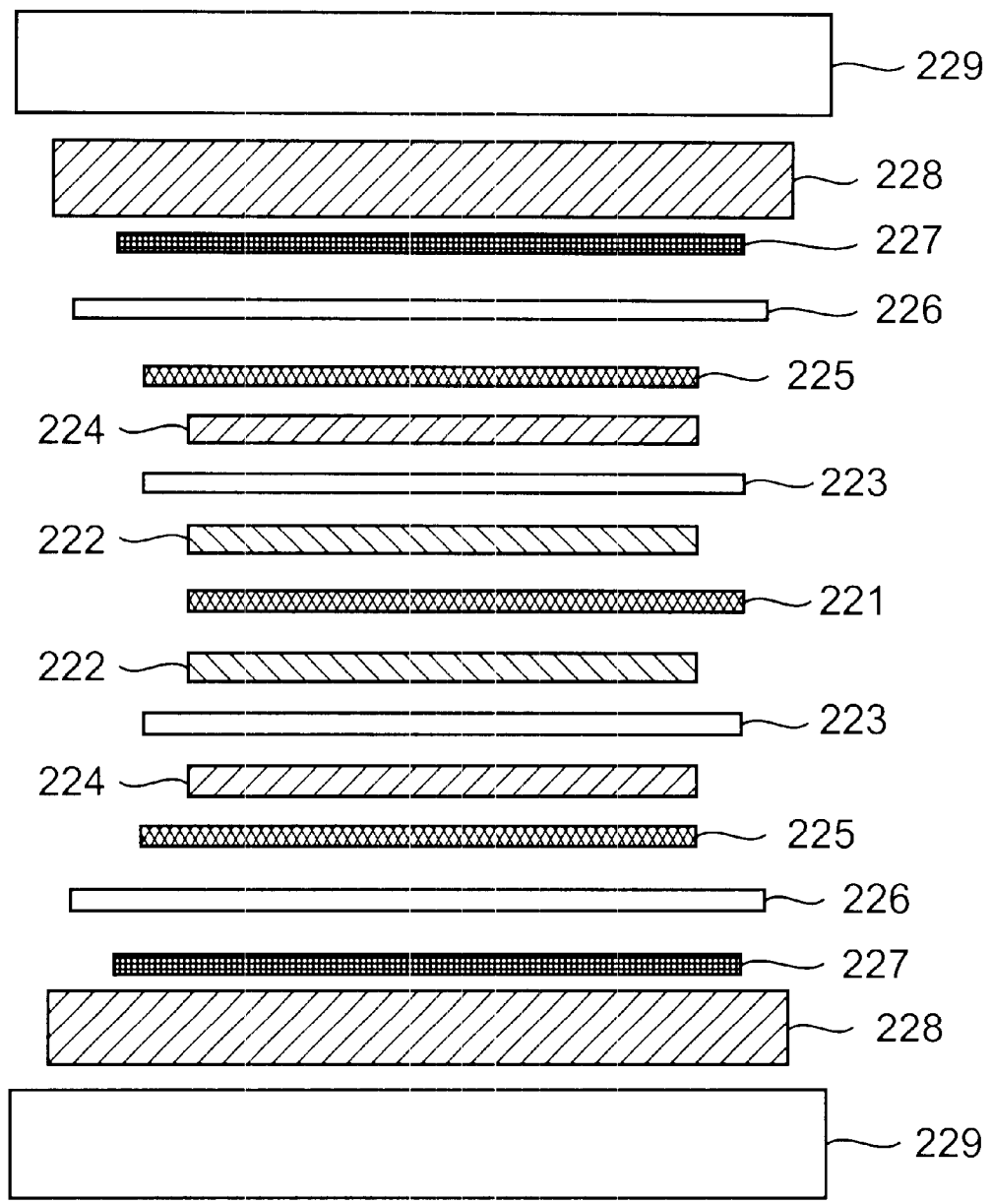
FIG. 2B Pressing of single bi-cell

FIG. 2B shows the way of stacking a set of laminated "bi-cell" components. The components of bi-cell is disclosed in U.S. Pat. No. 5,460,904 of Gozdz et al. on Oct. 24, 1995 comprising two of anodes, separators, cathodes, aluminum webs and release films which are symmetrical about a copper web 221 in order. In addition to the components mentioned above, the auxiliary layers, such as separators 227 and buffers 228 of pressing of the present invention were added.

Figure 2C:
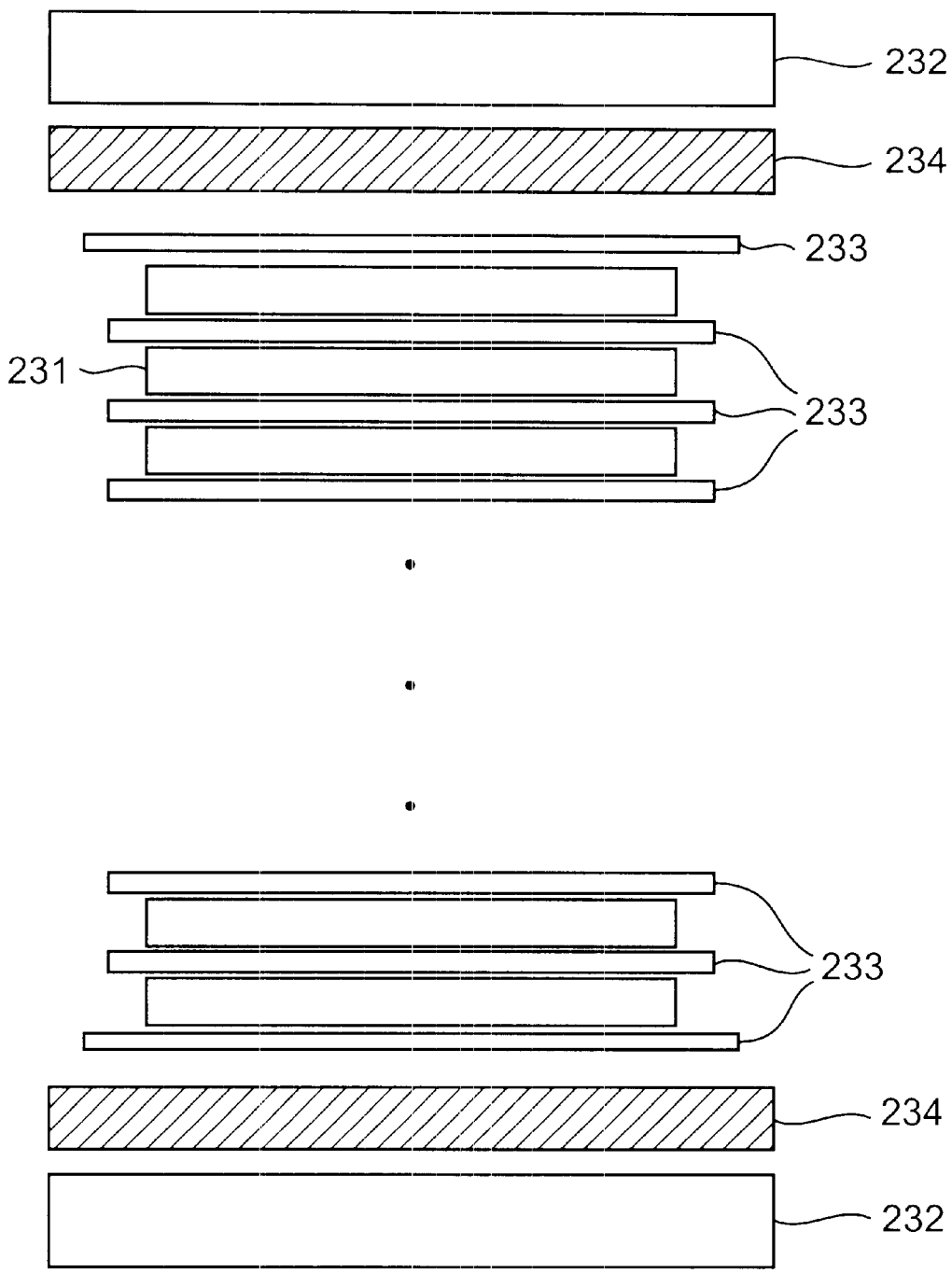
FIG. 2C Pressing of bi-cells with single opening, (the made battery being thinner.)
Figure 5:
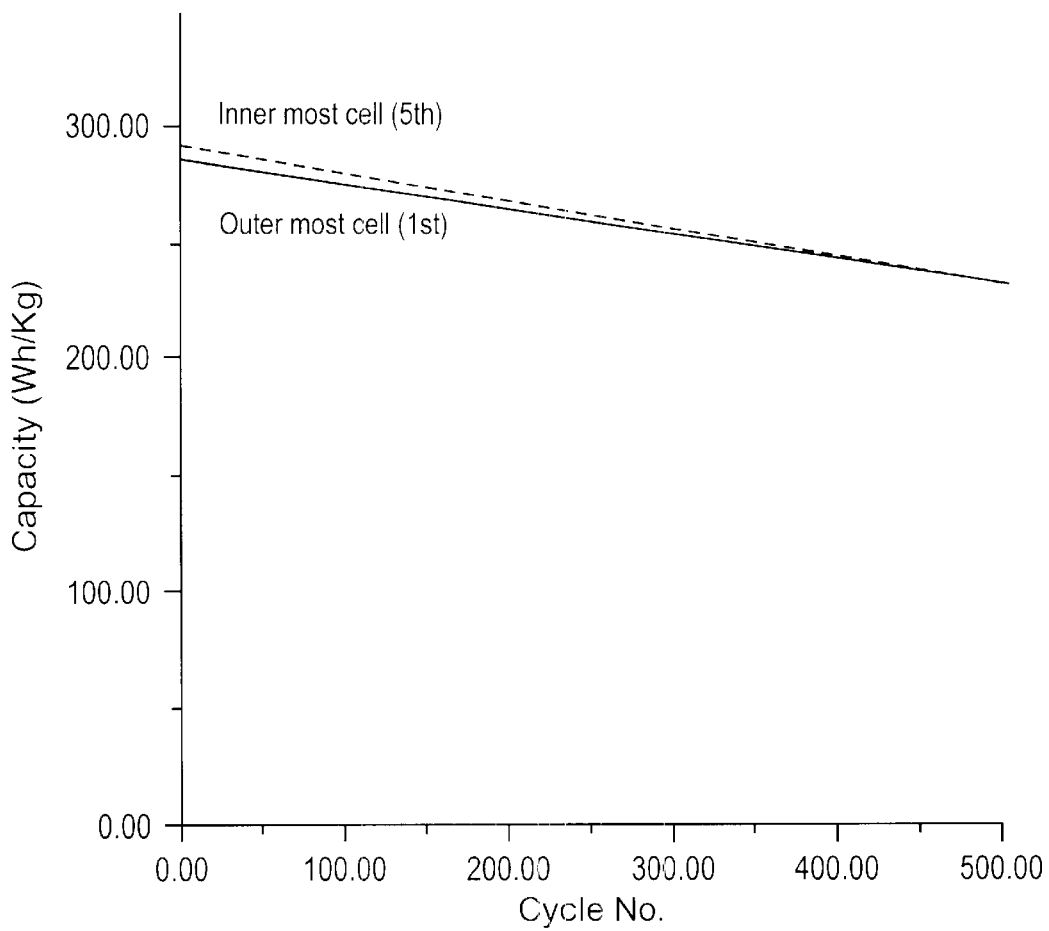
FIG. 5 Comparison of the outmost ($1^{st}$) and inner ($5^{th}$) layers for 10 single late cell components pressing FIG. 6 Temperature of the outmost layer for single cell FIG. 7 Temperature of the inner layer for single cell FIG. 8 Comparison of the outmost ($1^{st}$) and inner ($10^{th}$) layers for 20 single laminate cell components pressing FIG. 9 Comparison of the outmost ($1^{st}$) and inner ($15^{th}$) layer for 30 single laminate cell components pressing FIG. 10 Charge test for 14 layer of bi-cell
Figure 6:
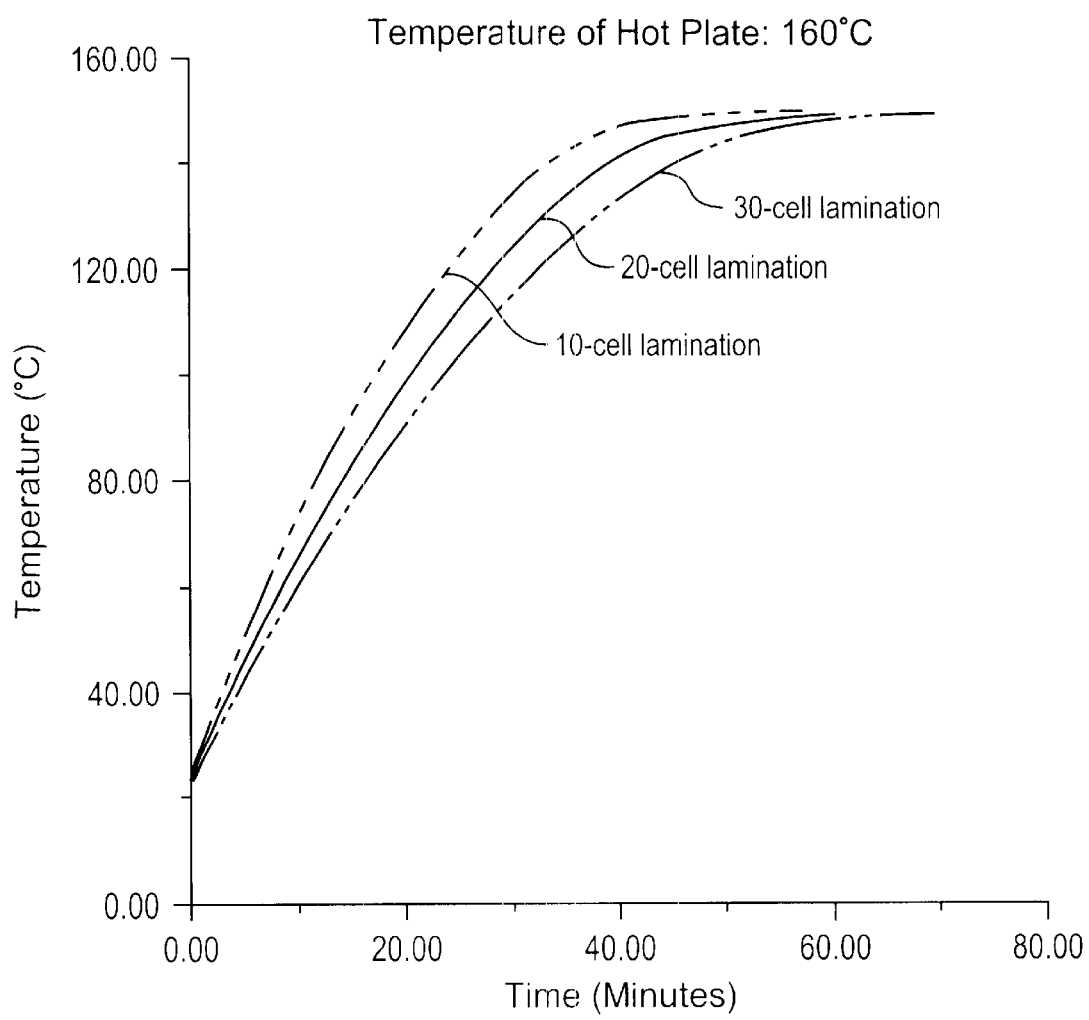
Figure 7:
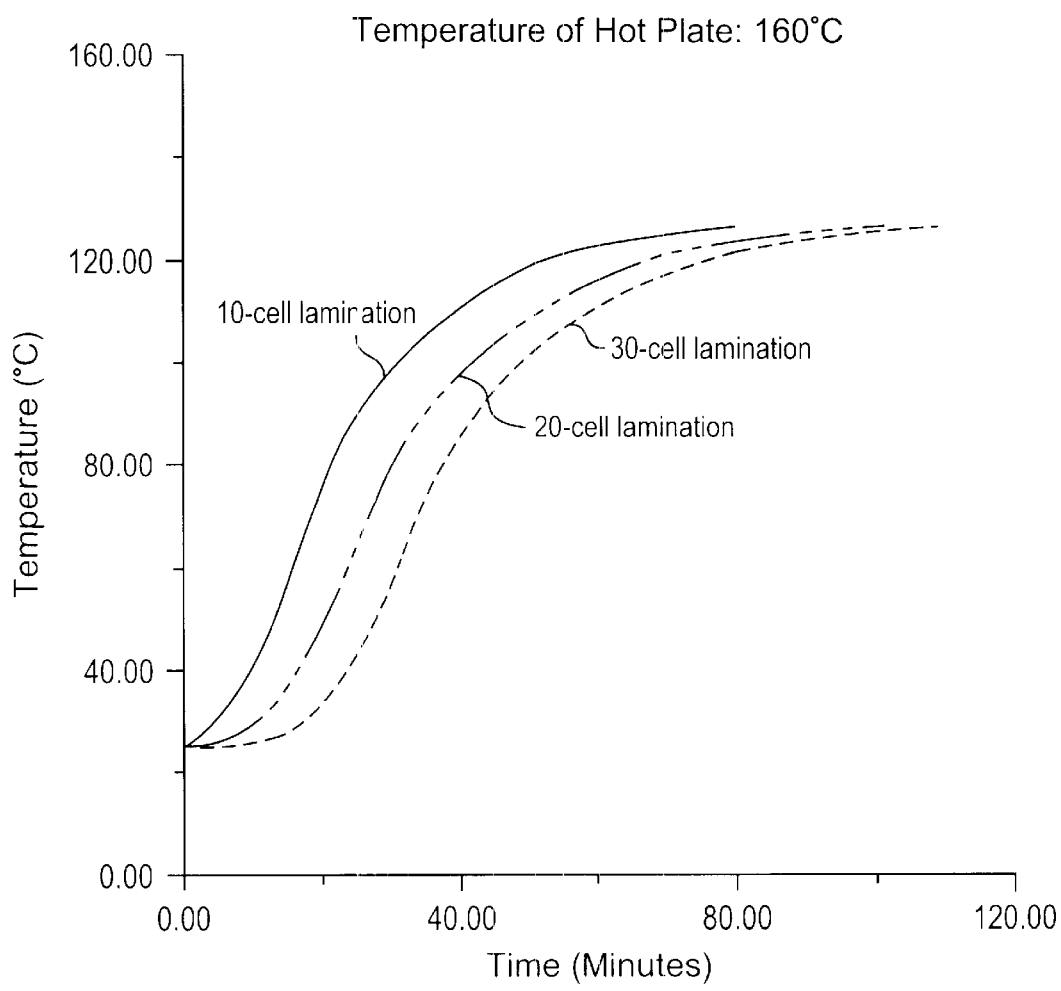

FIG. 2C illustrates the way of stacking a plurality of laminated components of bi-cells with one "opening". The opening is defined by the space between two heating plates of the press. The previously made cathodes, anodes, separators and current collector webs were stacked in advance into 10 laminated components of bi-cells. The heating plates of the press were heated up to 160° C. and put the stacked 10 laminated components into the opening between the heating plates. The pressing method used was single-step process: the stress was 400 psi and lasting for 240 secs, The separating plates used in this embodiment were carbon fiber reinforced polyimide plates (0.3 mm). The resistivity of 10 pressed cell preforms were ranged from 0.1–0.2 M Ω without the problems resulted from short circuit. Also, the stripping strength between copper web and anode was up to 0.4 kgf/in and the one between aluminum web and cathode was 0.45 kgf/in. The pressed preforms were extracted and activated by the same process and solution as that in example 1. Subsequently, the preforms were tested in discharge test and the results were shown in FIG. 5. The variation of the outmost and inner layers of cells in temperature was shown in FIG. 6 and FIG. 7, respectively. It is clearly that a period of time was required to reach the equilibrium in temperature of the outmost and inner layers of cells during pressing; that is, in his way the electrodes could get uniformly pressing. Therefore, it emphasizes the drawback in the features of cells from improper pressing, because of the temperature difference between inner and outer layers of the components resulting from the insufficient time of thermal conduction.

EXAMPLE 3
The Press of 20 Bi-Cells

Figure 8:
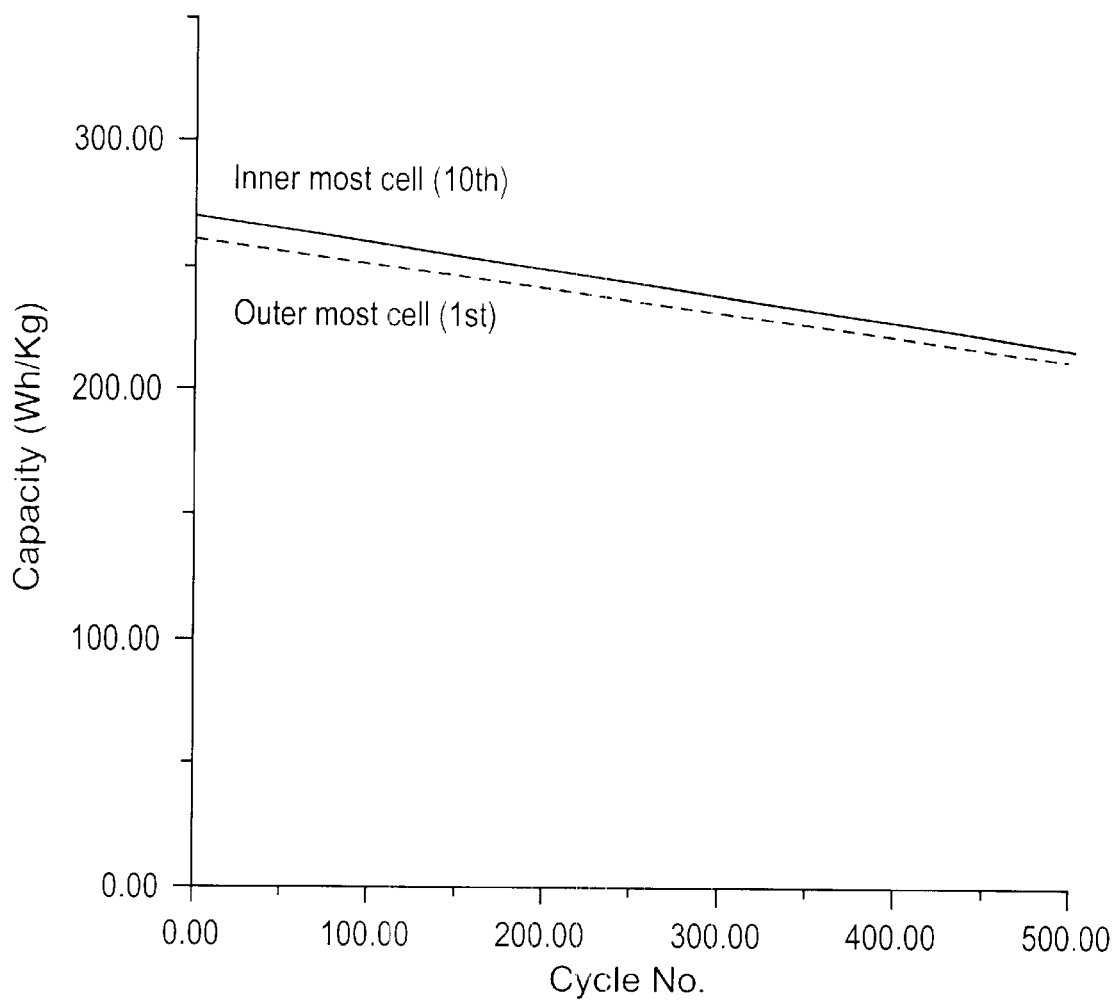

The above-mentioned cathodes, anodes, separator film and current collector web were preliminary stacked, as the way shown in FIG. 2C, into 20 components 231 of bi-cells. The heating plates of hot press (not shown) were heated up to 160° C., and then put the stacked 20 components of bi-cells into the space between the heating plates 232 of the hot press. Also, the required buffers 234 were added between the separating plate 233 and the heating plate 232. In this example, the graphite-enforced epoxy resin plates of high-temperature resistance were used for the separating plates. The pressing method used was two-step process: the laminated cell components 231 were first pressed between two heating plates 232 with 20 psi. After the temperature of inner layers of laminated cells reaching 100 C., the stress of second step was applied in 400 psi for 240 secs. The resistivity of the pressed cell preforms ranged from 0.1 M to 2 M Ω without the problem of short circuit caused by the contact of cathode and anode. In addition, the stripping strength between copper web and anode was 0.4 kgf/in; the stripping strength between aluminum and cathode was up to 0.45 kgf/in. Each cell preform was activated and filled by the electrolytes of example 1, and then tested with C/2 discharging rate test. The testing results were shown in FIG. 8. The changes in temperature of outmost and inner layers of cells were shown in FIGS. 6 and 7, respectively.

EXAMPLE 4
The Press of 30 Bi-Cells

Figure 9:
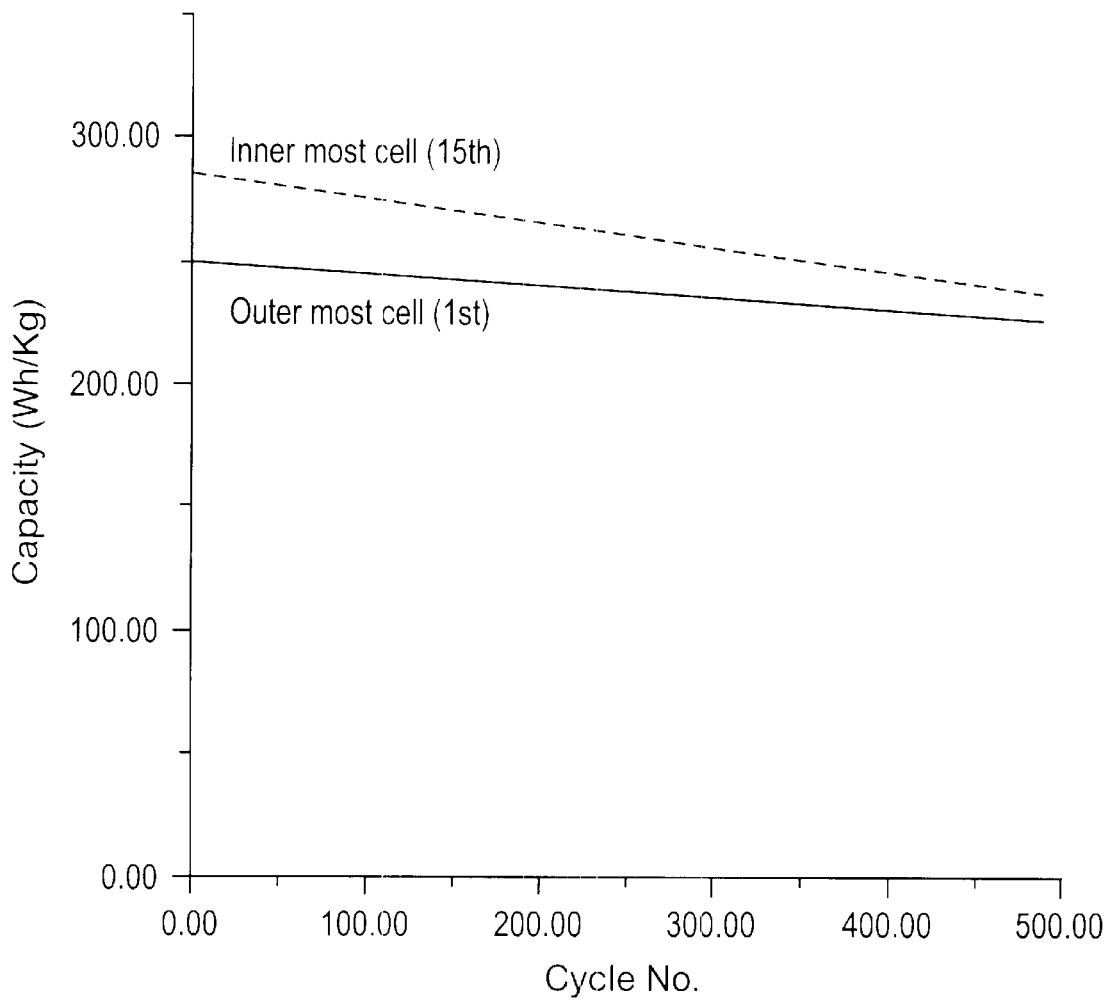

The above-mentioned cathodes, anodes, separator film and current collector web were preliminary stacked, as the way shown in FIG. 2C, into 30 components 231 of bi-cells between the heating plates 232. The heating plates 232 of hot press (not shown) were heated up to 160° C., and then put the stacked 20 components of bi-cells into the space between the heating plates 232 of the hot press. Also, the required buffers 234 were added between the separating plate 233 and the heating plate 232. In this example, the aluminum plates were used for the separating plates. The pressing method used was two-step process: the laminated cell components 231 were first pressed between two heating plates 232 with 20 psi. After the temperature of inner layers of laminated cells reaching 100° C., the stress of second step was applied in 400 psi for 240 secs. The resistivity of 30 pressed cell preforms ranged from 0.1 M to 2 M Ω without the problem of short circuit caused by the contact of cathode and anode. In addition, the stripping strength between copper web and anode was 0.4 kgf/in., the stripping strength between aluminum and cathode was up to 0.45 kgf/in. Each cell preform was activated and filled by the electrolytes of example 1, and then tested with C/2 discharging rate test. The testing results were shown in FIG. 9. The changes in temperature of outmost and inner layers of cells were shown in FIG. 6 and 7, respectively.

EXAMPLE 5
The Press of Multi-Layer Bi-Cells

Figure 2D:
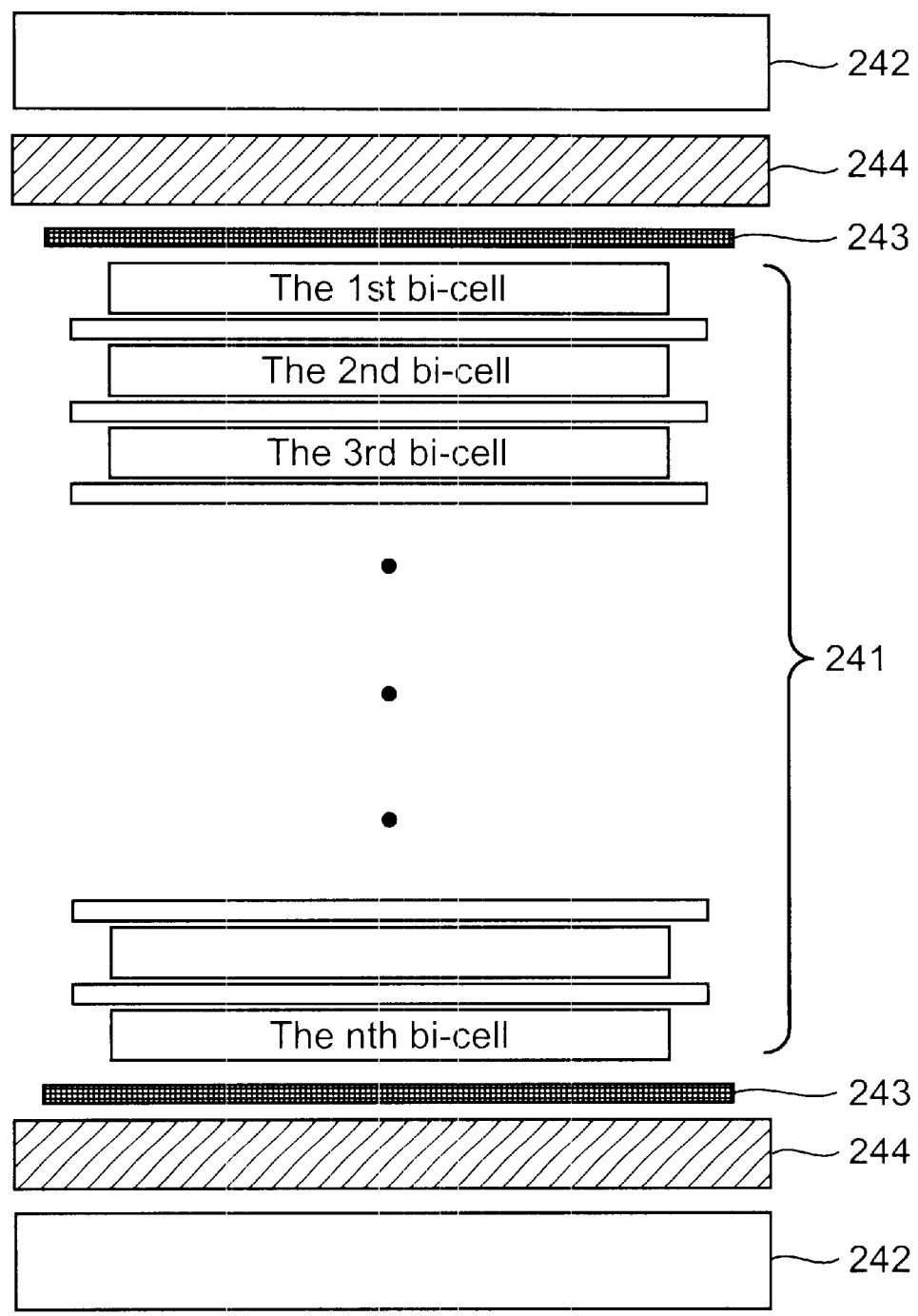
FIG. 2D Pressing of multi-layer bi-cells with single opening (the made battery being ticker).
Figure 10:
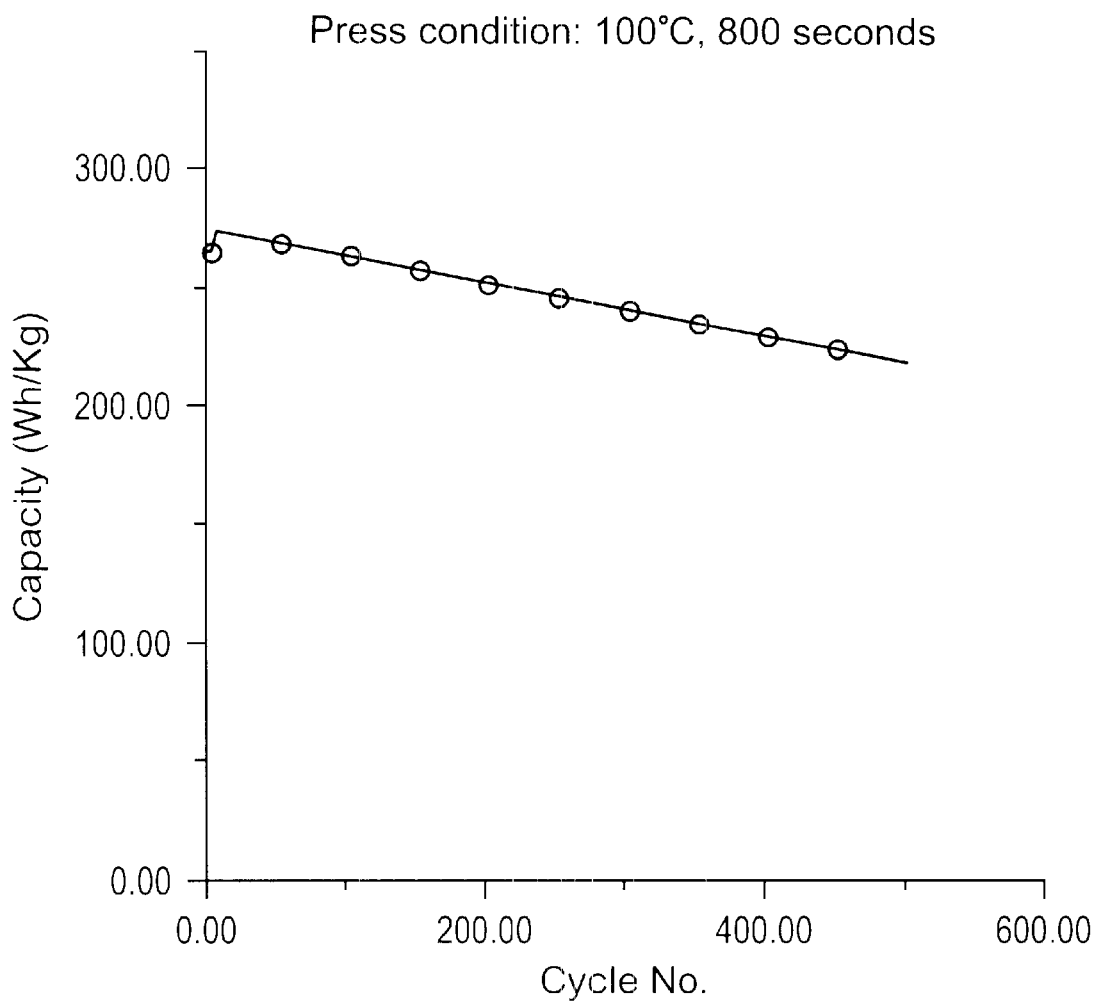

The above-mentioned cathodes, anodes, separator film and current collector web were preliminary stacked, as the way shown in FIG. 2D, into 14-layers components 241 of bi-cells in single opening. The heating plates 242 of hot press (not shown) were heated up to 160 C., and then put the stacked 14-layers components 241 of bi-cells into the space between the heating plates 242 of the hot press. Also, the required buffers 244 were added between the separating plate 243 and the heating plate 242. In this example, the coated woven-glass fabrics were used for the separator films. The pressing method used was two-step process: the 14-layers of laminated components 241 of cells were first pressed between two heating plates 242 with 20 psi. After the temperature of inner layers of laminated cells reaching 100 C., the stress of second step was applied in 400 psi for 240 secs. The resistivity of the pressed cell preforms ranged from 0.1 M to 2 M Ω without the problem of short circuit caused by the contact of cathode and anode. In addition, the stripping strength between copper web and anode was 0.4 kgf/in; the stripping strength between aluminum and cathode was up to 0.45 kgf/in. Each cell preform was activated and filled by the electrolytes of example 1, and then tested with C/2 discharging rate test. The testing results were shown in FIG. 10.

Figure 2E:
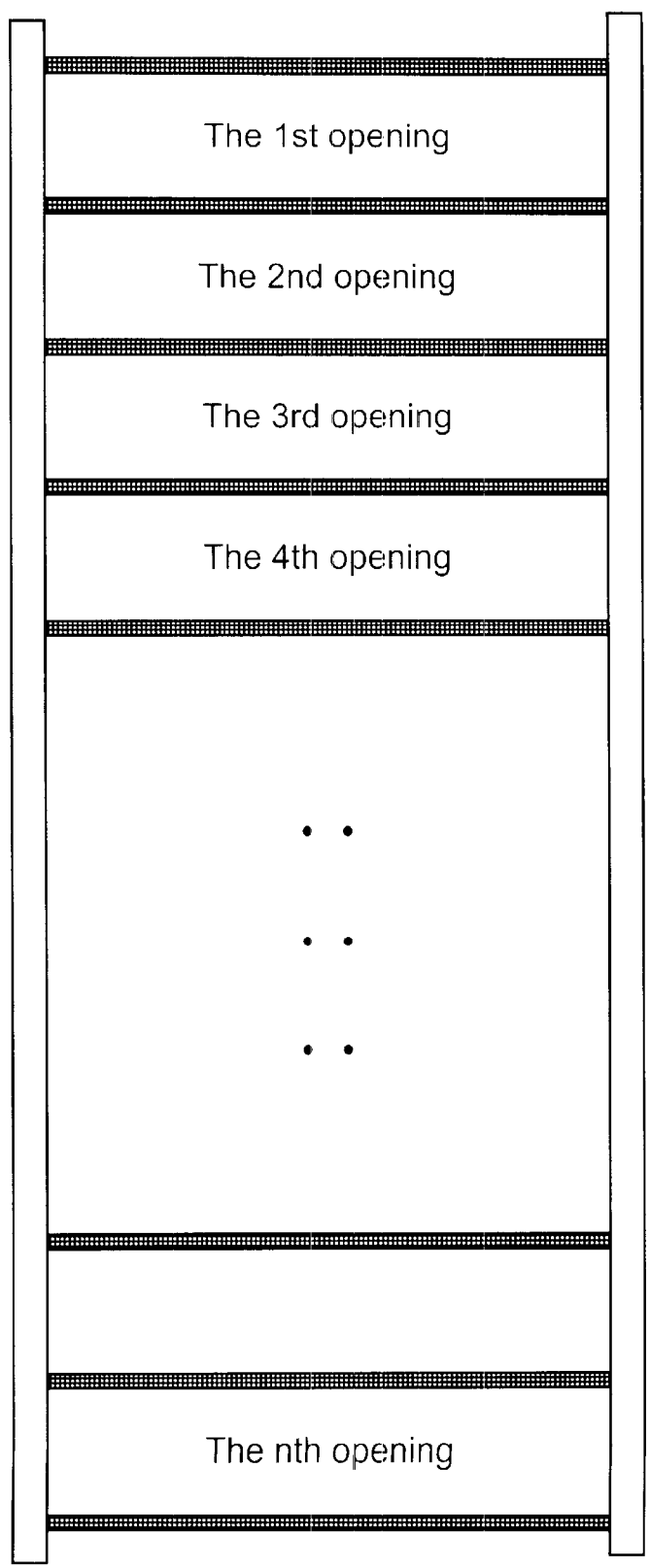
FIG. 2E Hot pressing with multi-opening

In FIG. 2E the "multi-opening in singlepressing" process is shown. That is, the above-mentioned laminated components of cells in a single opening were put in each of the openings defined by the two beating plates. The buffers could be added between each separating plates and heating plates (not shown) within each opening.

By the foregoing description, various processes embodying the present invention have been disclosed. However, numerous modifications and substitutions may be made without deviating from the scope of the present invention. Therefore, the above illustration is to disclose the present invention but not to limit the scope thereof.

What is claimed is:

1. A method of manufacturing batteries for the production of cell preforms and then activating the preforms into cells, comprising the steps of:

stacking layers of components into at least one set of laminated cell components;

adding an auxiliary layer onto a first and second sides of each of said laminated cell component;

fixing the temperature of at least two hot plates of a hot press;

placing at least one set of said laminated cell components along with said auxiliary layers into at least one opening in which an opening is defined by said two hot plates of said hot press;

pressing at least one set of said laminated cell components along with said auxiliary layers in at least one opening at said fixed temperature in order to form a cell preform from at least one set of said laminated cell component;

activating said cell preform into a cell; and packaging said cells into a battery, wherein said auxiliary layers include one or more of each of a buffer, a release film and a thermally-conductive separating plate.

2. The method of claim 1, wherein said battery is a secondary battery.

3. The method of claim 2, wherein said secondary battery is a lithium secondary battery.

4. The method of claim 2, wherein said secondary battery is a lithium polymer secondary battery.

5. The method of claim 1, wherein said laminated cell components are composed of one or more of each of cathodes, anodes, separators, and current collector webs.

6. The method of claim 1, wherein said buffer is a layer of Kraft paper or plastic plate.

7. The method of claim 1, wherein said release film is made of PET film or non-sticky plastic film.

8. The method of claims 1, wherein said thermally conductive plate is made of stainless steel, aluminum alloys, copper alloys, plastics, carbon-fiber reinforced polyimides, or graphite reinforced epoxy resins.

9. The method of claim 1, Wherein said at least two hot plates define the number of openings equal to the number minus one of said hot plates.

10. The method of claim 1, wherein said fixed temperature is from 25 to 200° C.

11. The method of claim 1, Wherein said pressing on said at least two hot plates at said fixed temperature involves at least one-step pressing with a multi-step increase in temperature.

12. The method of claim 11, wherein said at least one-step pressing is a two-step pressing.

13. The method of claim 12, wherein said two-step pressing is pressing at least one set of said laminated cell components at a first pressure and first temperature; after the temperature of said laminated cell components is the same as the temperature of said hot plates, pressing said laminated cell components at a second pressure and second temperature until all layers of said cell components completely stick together.

14. The method of claim 13, wherein said first pressure is from 5 to 40 psi.

15. The method of claim 13, wherein said second pressure is from 50 to 400 psi.

* * * * *